Patented July 30, 1940

2,209,445

UNITED STATES PATENT OFFICE 2,209,445

METHOD AND AGENT FOR BREAKING WATER-IN-OIL EMULSIONS

Boris S. de Mering, Houston, Tex., assignor to Standard Oil Development Company, a corporation of Delaware No Drawing. Application April 20, 1938,
Serial No. 203,115

9 Claims. (Cl. 252—333)

The present invention is directed to a method for breaking emulsions of oil and water, especially of the water-in-oil type, and to agents for use in such a method.

In the production of crude oil, water or brine is frequently simultaneously produced. The turbulent action to which the mixture is subjected results in the dispersion of the water in the form of fine particles in the oil, the dispersion being so complete that a more or less permanent emulsion results. When oil is stored for refining purposes, the small amount of bottom sludge and water that remains in the crude after treatment to break this emulsion accumulates from successive batches of oil and forms a very tight emulsion which is generally referred to as tank bottoms.

The object of the present invention is to provide a novel, inexpensive and efficient process for separating emulsions, of the kind referred to, into their component parts.

Novelty is imparted to the process of the present invention by virtue of the fact that a new demulsifying agent is employed, the actual procedural steps of the present process being substantially the same as those followed with other demulsifying agents. In general, the demulsifying agent of the present invention is used in small quantities. When used in large quantities it acts as an emulsifying agent.

In the past many attempts have been made to use sulfonic bodies obtained by the treatment of mineral oil with sulphuric acid, such bodies usually being obtained as byproducts from the acid refining of lubricating oils and medicinal oils, as agents for breaking emulsions of the type referred to above. These sulfonic bodies may be divided into two general groups, sludge layer sulfonic bodies and oil layer sulfonic bodies. The former are water soluble and the latter are oil soluble. Individually these sulfonic bodies are not wholly satisfactory as de-emulsifiers of water in oil emulsions since they act too slowly and must be assisted in their action by the use of undesirably high temperatures.

Attempts have been made to prepare a suitable demulsifying agent by mixing oil layer sulfonic bodies with sludge layer sulfonic bodies, the latter being obtained by the acid treatment of lubricating stocks. From the disclosures which have been made relative to the utility of such mixtures it is apparent that the ingredients used, particularly the sludge layer sulfonic bodies, were derived from the acid treatment of heavy oil, since the necessity for using a diluent, such as kerosene, with such mixtures has always been stressed. The use of the diluent is necessitated by the fact that sludge layer sulfonic bodies obtained by the treatment of heavy oil have a high pour point and so are not readily handled. The necessity for using a diluent adds to the cost of the demulsifying agent for a given potency.

According to the present invention, a demulsifying agent with a low pour point, which, therefore, does not require the employment of a diluent, is prepared by mixing oil layer sulfonic bodies produced by the treatment of lubricating and medicinal oils with sulphuric acid in the manner indicated in U. S. Patents Nos. 1,387,835; 1,387,868; and 1,811,535, with sludge layer sulfonic bodies obtained by the treatment of light oils, such as gas oil or light lubricating oil with sulphuric acid. Generally speaking, the sludge layer sulfonic acids are obtained by the acid treatment of oil having a viscosity, at 100° F., not substantially greater than 250 sec. Say. The two types of sulfonic bodies may be employed in any convenient ratio that will yield a mixture having a low pour point and low viscosity. In general, suitable mixtures will contain between 15% and 35% by volume of the oil layer sulfonic bodies and 85-65% by volume of the sludge layer bodies, these percentages being based on a fluxed oil layer soap containing about 75% of the soap and on an ammoniacal solution of the sludge layer soap containing about 58% by volume of aqueous ammonia.

Briefly, the oil layer sulfonic bodies employed according to the present invention are obtained by treating a crude oil, which is generally of the coastal or mid-continent type, with fuming sulphuric acid (20% oleum), using about 20% to 60% of acid by volume of the oil, neutralizing the treated oil, after the separation of sludge, with caustic soda, and extracting the sodium soap from the oil layer by washing with isopropyl alcohol of about 55% strength. The alcoholic extract containing the soap is distilled to recover alcohol and evaporate water, and the residue is dissolved in strong alcohol, treated for the neutralization of excess alkali, and distilled to remove the alcohol. At this stage the residue is generally mixed with a fluxing oil, which is of the lubricating type, in order to render it sufficiently fluid for handling. This fluxing oil is the hydrocarbon oil hereinafter referred to.

As previously indicated, the sludge layer sulfonic bodies are prepared by treating light oil having a viscosity not substantially greater than 250 sec. Say. at 100° F. with sulphuric acid. The acid employed is 98% acid or fuming acid. The treatment is conducted in several stages, the first of which is a cutter stage in which a relatively small amount of acid, such as five pounds per barrel of oil, is employed. The sludge from this stage is discarded and the oil is then treated in one or more stages with about fifteen pounds of acid per barrel of oil at a temperature 85°–150° F. The sludges obtained in these treatments are collected, mixed with hot water, and steamed, whereupon they separate into several layers, one of which is oil, another of which is aqueous sulphuric acid, and a third of which contains the sulfonated bodies. It may be pointed out here that the steaming hydrolizes any sulphuric acid esters present, freeing the oil and the sulphuric acid. The sulfonated bodies do not go into solution in the aqueous layer due to the high free acid content of this layer. Thus, the sulfonated bodies may be recovered from the separated oil and sulphuric acid.

The sulfonated bodies produced in the manner indicated above can be used in the acid state, the neutral state or the alkaline state, depending upon the particular type of emulsion to be treated. Some emulsions respond more readily to acid demulsifiers while other require a non-acid demulsifier. In any case, preliminary experiments must be made to determine exactly what type of demulsifier must be employed, since each emulsion presents an individual problem insofar as the question of whether the demulsifying agent should be acid or alkaline is concerned. When it is desired to use the sulfonic bodies in the neutral or alkaline state they can be converted into this state by caustic or ammonia. In some cases it is advantageous to use an excess of ammonia.

A typical demulsifying composition, according to the present invention, containing 75% of sludge layer bodies and 25% of oil layer bodies has the following actual composition and characteristics:

Sludge-layer soaps (ammonium) _____ 32.2% by volume
Oil-layer soaps (sodium) ____ 18.75% by volume
Hydrocarbon oil* _____ 6.25% by volume
Aqueous ammonia _____ 42.8% by volume
Absolute pour point _____ 0° F. to −5°F.

*Flux in purified oil-layer soap.

The demulsifying properties of the above blend as compared to other demulsifying agents of the sulfonic type derived from mineral oils is shown in the following table in which the above composition is referred to as agent A, agent B is an ammoniacal solution of sludge layer ammoniacal sulfonic soaps from high viscosity oils (about 600 Say. at 100° F.) containing 70% of the latter and 30% of aqueous ammonia, agent C is a mixture containing 54.5% of agent B, plus 27.3% of oil layer sulfonic bodies in the form of their sodium soaps and 18.2% of kerosene, and agent D is a mixture of 70% of sludge layer ammoniacal sulfonic soaps from low viscosity oils, plus 30% of aqueous ammonia. Two different types of tank bottoms, X and Y, were treated, the one being treated with all four agents and the other being treated with only agents A and C. The treating was carried out by adding 2 cc. of 10% solutions of the various agents in water to 100 cc. of the emulsion and heating the mixture to 170° F.

| Demulsifying compound | Effect upon emulsion | |
| --- | --- | --- |
| | Tank bottoms X | Tank bottoms Y |
| A | Complete break in 45 minutes; clear water on bottom, pipe line oil on top; no sludge. | Complete break in 45 minutes; clear water on bottom, pipe line oil on top; no sludge. |
| B | | Pipe line oil on top, "muddy" water on bottom, and sludge between oil and water within 45 minutes. |
| C | Partial break in less than 45 min.; no clear separation; sludge between pipe line oil and water at end of 1 hour. | Pipe line oil separated from sludge and water within 45 minutes; sludge remained between oil and water at end of 1 hour. |
| D | | Pipe line oil on top, no free water; sludge on bottom at end of 1 hour. |

It will be noted that the sludge sulfonic bodies from heavy oils were more effective than the sludge sulfonic bodies from light oils while a mixture of the latter with oil layer sulfonic bodies was distinctly more effective than a mixture of the former with oil layer sulfonic bodies. The latter mixture was diluted with kerosene in order to make it easier to handle and to increase its dispersion in the emulsion. In other words, it was used under the conditions most favorable for its effectiveness. Thus, the composition according to the present invention not only eliminates the necessity of using the dispersing agent which is required when the sludge layer bodies from low viscosity oils in the mixture of the present invention are replaced by sludge layer bodies from high viscosity oils, but it is more effective than is the mixture containing the sulfonic bodies from high viscosity oils and the dispersing agent.

As previously indicated, the demulsifying composition of the present invention is used in small amounts. The particular amount to be used will vary with individual emulsions, being greater for tank bottoms and other emulsions which are difficult to seperates than for fresh emulsions of crude oil and water as produced from a well. In general, it is necessary to use at least one part of the demulsifying composition for 60,000 parts of emulsion and not more than one part of the demulsifying composition for each 1,000 parts of emulsion.

The demulsifying composition of the present invention can be used in any of the ways which have been employed with other demulsifying agents. Particularly, in treating emulsions produced from wells, it is advantageous to add the demulsifier to the crude emulsion as close to the outlet of the well as possible, so as to take advantage of the heat contained in the crude oil and to provide more thorough mixing. In general, on light gravity crudes, the inherent heat of the crude is sufficient for the emulsion breaking operation. When additional heating is required, it is sufficient, with the demulsifier of the present invention, to raise the temperature of the crude to not more than about 120° F. and in no case above about 150° F. Of course, with the tank bottoms, higher temperatures are often employed as indicated in the foregoing example.

In the foregoing example the sludge layer sulfonic body of the composition according to the present invention was obtained from an oil having a viscosity of 78 sec. Say. at 100° F. As previously indicated, sludge layer sulfonic bodies used in the composition and method of the present invention are derived from mineral oils having a viscosity at 100° F. of not more than about 250 sec. Say. For the best results the oil selected for the production of the sludge layer sulfonic bodies for use according to the present invention, are those having a viscosity, at 100° F., of less than 150 sec. Say., and are preferably those having a viscosity, at 100° F., lying within the range of 75-85 sec. Say.

In the appended claims the term "sulfonic bodies" is used to designate sulfonic acids, per se, as well as the alkali metal or ammonium slats thereof. The terms "about" and "approximately" are employed to indicate a permissible variation of not more than 20% from the numerical value stated.

I claim:

1. A method for breaking a petroleum emulsion of the water-in-oil type which comprises subjecting the emulsion to the action of a demulsifying agent comprising an oil layer mineral oil sulfonic body and a sludge layer sulfonic body derived from a mineral oil having a viscosity less than about 250 sec. Say. at 100° F.

2. A process for breaking a petroleum emulsion of the water-in-oil type which comprises subjecting the emulsion to the action of a demulsifying agent composed of a major proportion of a sludge layer sulfonic body derived from a mineral oil having a viscosity of not more than about 250 sec. Say. at 100° F., and a minor proportion of an oil layer mineral oil sulfonic body.

3. A process for breaking a petroleum emulsion of the water-in-oil type which comprises subjecting the emulsion to the action of a demulsifying agent composed of 15-35% by volume of an oil layer mineral oil sulfonic body in the form of a readily flowing body containing about 25% by volume of a fluxing oil, and between 85% and 65%, by volume, of a sludge layer sulfonic body derived from a mineral oil having a viscosity of not more than about 250 sec. Say. at 100° F. in the form of an ammoniacal solution containing a large percentage of aqueous ammonia.

4. A demulsifying composition for water-in-oil emulsions comprising an oil layer mineral oil sulfonic body and a sludge layer sulfonic body derived from a mineral oil having a viscosity of not more than about 250 sec. Say. at 100° F.

5. A composition, according to the preceding claim, in which the sludge layer sulfonic body is one derived from a mineral oil having a viscosity, at 100° F. of less than 150 sec. Say.

6. A composition, according to claim 4, in which the sludge layer sulfonic body is one derived from a mineral oil having a viscosity, at 100° F., within the range of 75-85 sec. Say.

7. A composition, according to claim 4, in which the sludge layer sulfonic body is the major component.

8. A composition, according to claim 4, in which the oil layer sulfonic body is in the form of a readily flowable mixture with a fluxing oil and constitutes 15-35%, by volume, of the demulsifying composition.

9. A composition, according to claim 4, in which the sludge layer sulfonic body is in the form of an ammoniacal solution containing a large percentage of aqueous ammonia and said solution constitutes 64-85%, by volume, of the demulsifying composition.

B. S. DE MERING.